Patented Nov. 21, 1950

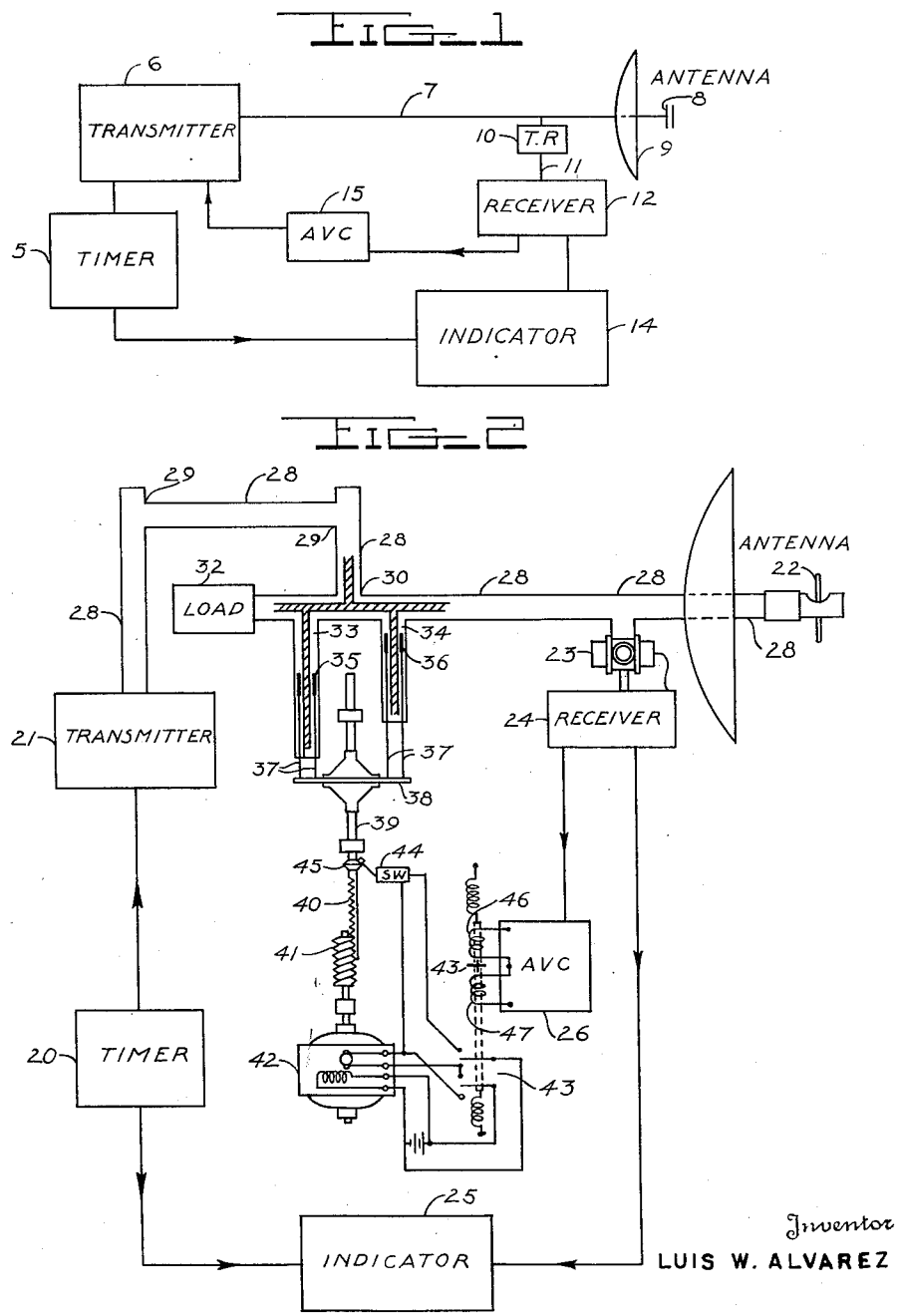

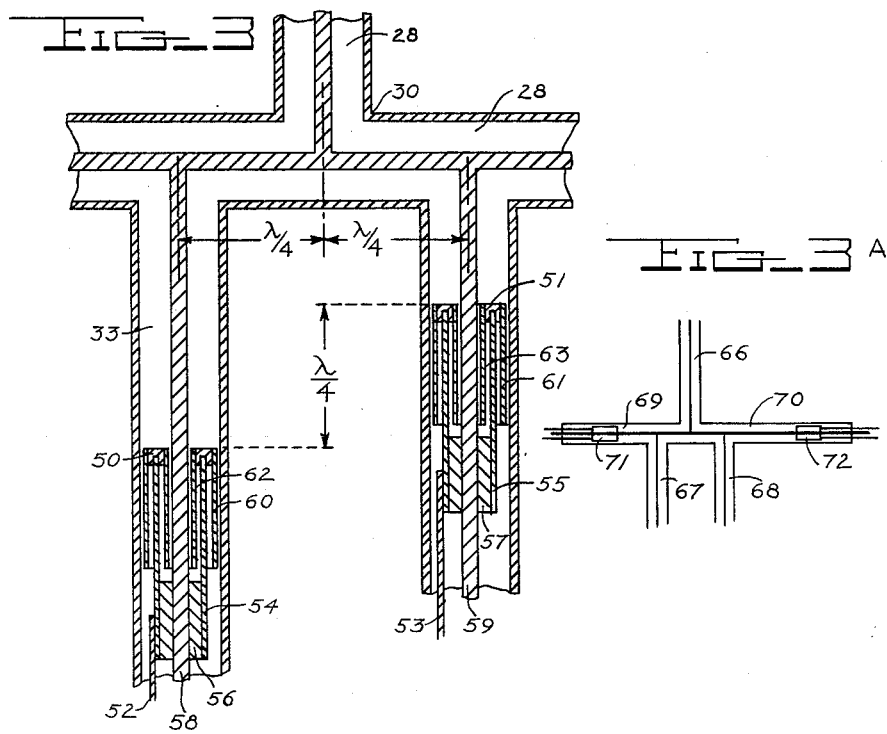

2,530,418

UNITED STATES PATENT OFFICE 2,530,418

RADIO-ECHO DETECTION AND LOCATION APPARATUS FOR APPROACHING HOSTILE CRAFT

Luis W. Alvarez, Chicago, Ill., assignor, by mesne assignments, to the United States of America as represented by the Secretary of the Navy Application December 15, 1943, Serial No. 514,404

9 Claims. (Cl. 343—13)

This invention relates to systems for the detection and location of distant objects, especially water craft and aircraft, and concerns more particularly the provision of means associated with such systems adapted to lead the personnel of the observed craft to suppose that the craft carrying the radio-echo detection equipment is not approaching or is indeed receding. When patrol or other warcraft, which may be airplanes or surface vessels, employ detection apparatus of the radio-echo type, the pulses of radio waves transmitted by such apparatus may serve to warn other craft of the approach of the patrol. Indeed, such warnings may be given before the patrol craft is aware of the presence of the other craft, since the path of transmission is doubled by the requirement of a return signal and additional attenuation is caused by scattering at the target. Warning of the approach of a patrol craft may thus extend to very considerable distances, such as 200 miles or more. In consequence, the hunted craft may postpone taking protective measures (as in the case of a submarine which is surfaced for the purpose of charging its batteries) until the patrol craft is close enough to present an imminent danger and for this purpose the hunted craft will be tempted to rely upon the strength of the pulses of radio energy in order to determine the nearness of the patrol craft and to rely upon the change of the intensity of these pulses in order to determine whether the patrol craft is approaching or receding.

It is an object of this invention to provide means for controlling the signal strength of transmitted radio waves in such a manner that the hunted craft will not be able to observe any increase in signal strength as the patrol craft approaches. It is a further object of this invention to provide means for so controlling the intensity of transmitted radio-waves that the craft being approached will actually observe a progressive decrease of signal strength while the patrol craft is approaching. It is a still further object of this invention to provide for control of the intensity of transmitted radio-waves as aforesaid without decreasing the intensity of echo signals received by the patrol craft below a predetermined minimum signal strength.

The received signal strength of an echo signal may be expected to be inversely proportional to the fourth power of the distance, the observations agreeing quite closely with theory in this regard. A general expression for the received power may be given as follows:

$$P_r = \frac{P_t}{16\pi^2} \cdot \frac{GA\alpha}{r^4}$$

in which $P_r$ is the power received, $P_t$ is the power transmitted, $r$ is the distance of the reflecting object, $\alpha$ is its effective reflectivity, and $G$ is the gain of the transmitting antenna, and $A$ is the effective aperture area of the receiving antenna system.

Let it now be assumed that the received power varies inversely as the fourth power of the distance. If an approaching patrol craft, having just detected the presence of a distant craft, thereafter limits the strength of the transmitted pulses as they are transmitted from the patrol craft to the intensity just barely necessary to produce an echo of predetermined intensity when received, the result will be that as the patrol craft approaches the other craft, the transmitter output is reduced by a factor which is inversely proportional to the fourth power of the distance. Since the effect of the distance between the two craft upon the signal strength as observed at the craft being approached is an increase inversely proportional only to the second power of the distance, the net result of the change of transmitter power output and of the effect of the change of distance, as observed at the craft being approached will be a decrease of signal strength, indeed a change of signal strength in the direct proportion to the square of the distance, exactly as if the approaching craft were proceeding in the opposite direction without changing its transmitter power output.

The provision of means for controlling the transmitter output as aforesaid may therefore enable the patrol craft to catch the other craft unawares in spite of the fact that the other craft may have received and identified the signals resulting from the operation of the radio-echo location equipment of the patrol craft.

Even if the transmitter power is reduced inversely in proportion with some power of the distance lower than the fourth and higher than the second, control of the transmitter power output in accordance with this invention will result in some reduction in the signal strength as detected at the target during the approach of the patrol craft. When the two craft are quite close to each other and the target craft happens to provide a considerable amount of plane mirror reflection towards the patrol craft, an inverse-second power relation of echo strength to distance may hold, but this situation is so rare in tactical practice as to be insignificant. In cases of operation near the surface of the sea over long distances at which the power received in echoes is believed to vary inversely with the eighth power of the distance, a particularly confusing effect can be produced by means of this invention. This invention, therefore, provides an effective measure for confusion and surprise of many various types of enemy craft.

Typical arrangements for providing control of transmitter power in accordance with the present invention are illustrated in the drawings, in which:

Fig. 1 and Fig. 2 are schematic diagrams illustrating the organization of radio-echo detection systems, including means from controlling transmitter power in accordance with received signal strength;

Fig. 3 is a cross-section of a radio-frequency power divider adapted for use in a system such as that shown in Fig. 2 for the purpose of controlling transmitter output power appearing at the antenna; and Fig. 3A is a diagrammatic cross-section of a modification of the apparatus illustrated in Fig. 3.

The block diagram shown in Fig. 1 is a greatly simplified diagram of a radio-echo detection and location system. At intervals controlled by the timer 5 the transmitter 6 generates short-duration pulses of radio waves. These pulses may have a duration of about one microsecond each and may be spaced about 500 or 1000 microseconds apart. The formation of the pulses is generally accomplished by means of a pulsing or modulating circuit which may be regarded as part of the transmitter and which is adapted to be brought into action upon the provision of a suitable stimulating pulse from the timer 5. The pulses of radio waves generated by the transmitter 6 are then transmitted along the transmission line 7 to the antenna 8 which cooperates with various well-known elements, including a parabolic reflector 9, in order to form a highly directive beam of radiation. When one of these pulses is being transmitted in the transmission line 7, an electric breakdown discharge is caused to occur in a protective device 10 indicated on Fig. 1 by a block labelled "T-R," thus short-circuiting the transmission line 11 which connects the transmission line 7 to the receiver 12. The protective breakdown device 10 thus protects the receiver 12 against overload during transmitter operation and may be regarded as a transmit-receive switch. At the same time the short circuit in the protective device appears as an open circuit across the transmission line 7 because of the electrical distance between the short circuit and the transmission line T-junction.

During the period between transmitted pulses there will be no breakdown in the device 10 so that echo signals picked up by the antenna 8 will be able to proceed to the receiver 12. The receiver 12 is a detecting and amplifying apparatus and may be adapted to operate on the heterodyne principle, in which case a first and a second detector are necessary. The output of the receiver 12 is furnished to an indicator 14 which also receives synchronizing signals from the timer 5 and is adapted to indicate not only the presence of the received echo but also the time elapsing betwen the transmission of a pulse and the reception of a corresponding echo. If desired, the indicator may also be adapted to correlate the indication of echoes and elapsed time with the indication of the orientation of the antenna system at the time of the transmission.

In order to control the intensity of the pulses radiated from the antenna 8 in accordance with the present invention, the receiver 12 furnishes a voltage which is indicative of the received signal strength to an automatic volume control apparatus 15. Such voltage may be a portion of the intermediate frequency signal in the case that the receiver 12 is of the heterodyne type. In such case the signal is rectified to provide a suitable control signal. When the transmitter 6 operates to produce relatively short pulses, such as pulses having a duration of only about one microsecond, the automatic volume control apparatus 15 is preferably provided with a pulse-lengthening circuit which may be a circuit including a gas discharge tube adapted to produce a relatively long pulse, having a duration of 30 or 100 microseconds or more whenever a short duration pulse is presented to the input of said circuit. The output of such circuit, consisting of relatively longer pulses, may then be employed (after amplification, if desired,) to operate either electrically or mechanically a control device which is adapted to reduce the power output of the transmitter 6 when the signal strength of the echo in the receiver 12 exceeds a predetermined value, so that the signal strength will tend to be stabilized at such value as a maximum.

Pulse-lengthening circuits suitable for use in the automatic volume control apparatus 15 are disclosed in the patent application of H. G. Weiss, Serial No. 512,926, filed December 4, 1943. Other types of pulse-lengthening circuits are known which might also be used.

The control of the transmitter output by the automatic volume control circuit may be exercised in any of a number of ways. The more obvious ways include control of the anode voltage applied to the transmitter, and the like, but these methods are generally unsuitable for transmitters employing transmitting tubes of the magnetron type for generating radio-waves, because such transmitting tubes require for best operation a rather close correlation of the anode voltage and of the field strength of the magnet. In addition, variation of the load on the modulator circuit may react upon the power supply and cause excessive voltages to appear, or other bad effects. In consequence, it is found that the most practical method of controlling transmitter output power where the transmitting tube is of the magnetron type is a method in which a controllabe portion of the output power is absorbed in a load or "dummy antenna" instead of being radiated. An arrangement of this type is illustrated in Fig. 2.

In Fig. 2 the timer 20, the transmitter 21, the antenna 22, the protective breakdown device 23, the receiver 24, the indicator 25 and the automatic volume control apparatus 26 operate in essentially the same manner as the correspondingly named elements shown in Fig. 1, indicated at 5, 6, 8, 10, 12, 14 and 15, respectively. The transmission line between the transmitter 21 and the antenna 22 is shown more fully on Fig. 2 as being of the coaxial-conductor type. This transmission line is indicated at 28, passing around stub-supported corners shown at 29. The transmission line 28 passes through the leg and one arm of a T-junction 30 which forms part of a power divider which is adapted to direct the power delivered by the transmitter 21 either to the antenna 22 or to a load 32 or partly to each in controllable proportions. The transmission lines in the neighborhood of the T-junction 30 are shown broken away in part in order to illustrate the organization of the power divider apparatus.

The power divider apparatus includes two branch transmission lines 33 and 34 situated respectively on either side of the center of the T-junction 30 at a distance of a quarter-wave length therefrom. The branch line 33 is terminated by an adjustable plug 35 and the branch line 34 is terminated by an adjustable plug 36. The plugs 35 and 36 are adapted to be moved simultaneously in such a manner that a constant difference of a quarter-wave length will be maintained between the respective lengths of the branch lines 33 and 34 when these are considered as terminated by the plugs 35 and 36 respectively. The plugs 35 and 36 are actuated by the rods 37 mounted upon a frame or yoke 38 carried on a longitudinally slidable shaft 39.

The load or dummy antenna 32 should be so matched to the characteristic impedance of the transmission line 28 that little if any standing waves will be set up thereby in the transmission line 28. This load may be a water flow type absorber, but is more conveniently provided in dry form. A suitable (dry) load may be a mixture of graphite and sawdust in a proportion adapted to provide the desired characteristic impedance, or it may be a ferromagnetic type of absorbing material, such as finely divided iron dust of the type used for high-frequency transformer cores, held in a binder of dielectric lacquer. If the load chosen for the system does not exactly match the characteristic impedance of the transmission line, a known form of transforming arrangement may be inserted between the load and the transmission line.

When no signals are being received or when the signals received are of less than the predetermined signal strength which is considered a necessary minimum for satisfactory operation, it is desirable that practically all of the power of the transmitter 21 should be provided to the antenna 22 and that as little as possible should be absorbed in the load 32. For this condition the power divider apparatus should be so adjusted that the branch line 34, short-circuited by the plug 36, should have a length of a quarter-wave length, thus exercising substantially no interference with transmission of energy to the antenna 22, and that the branch line 33, short-circuited by the plug 35, should have a length of substantially a half-wave length, thereby short-circuiting the transmission line leading to the load 32 but presenting a high impedance at the T-junction 30 and thereby causing little if any interference with the transmission of energy along the transmission line 28 to the antenna 22.

When the received signals begin to exceed the aforesaid predetermined minimum signal strength, however, it is desirable to begin to divert a portion of the power furnished by the transmitter 21 to the load 32 and thereby to diminish the power radiated by the antenna 22. This may be done by simultaneously lengthening the branch lines 33 and 34. It will be noted that such simultaneous lengthening of these branch lines will not set up any substantial amount of standing waves in the transmission line 28, but will preserve the desired condition of impedance matching, because the susceptance presented at the T-junction 30 by the lengthening of the line 34 will balance the substantially equal and opposite susceptance presented at the same point by the lengthening of the line 33. This results from the fact that the distances from the center of the T-junction 30 to the respective short-circuited ends of the lines 33 and 34 differ by a quarter-wave length. Thus simultaneous lengthening of the lines 33 and 34 will effect a change in the distribution of the transmitter power output between the antenna 22 and the load 32, without any substantial effect upon the impedance match or loading of the output of the transmitter 21. Thereby is avoided the often troublesome change of frequency, known as "pulling," which results from changing the loading or impedance match of the transmitter output.

In order to provide the desired simultaneous control of the short-circuiting plugs 35 and 36, the shaft 39 is cut away at its lower extremity to provide a rack surface shown at 40 which is adapted to engage a worm gear 41 driven by a motor 42. The motor is adapted to be driven in either direction by a double-action relay 43 which preferably also has a neutral position for which the motor is stopped. The circuit which is adapted to drive the motor in the direction which moves the plugs 35 and 36 towards the transmission line 28 (upwards on Fig. 2) is provided with an interposed limit switch 44, so that when the received signal becomes weaker than the predetermined minimum signal strength the motor will drive the shaft 39 until the adjustment is reached for which substantially all the output of the transmitter 21 is furnished to the antenna 22 and substantially none is provided to the load 32 (that is to say the line 34 is a quarter-wave length and the line 33 is a half-wave length), at which point the switch 44 will be opened by the cam 45 mounted on the shaft 39 and the motor then will be brought to a stop.

If desired, power may be diverted to the load 32 by advancing rather than retracting the plugs 35 and 36 from the position corresponding to the furnishing of maximum power to the antenna 22, but if for the latter condition the line 34 has a length of a quarter-wave length, it will not be practical to advance the plugs 35 and 36 to the extent needed to switch practically all of the power in the transmitter 21 towards the load 32. This may not be important for some types of apparatus, but it is generally convenient to permit the possibility of diverting substantially all the power to the load 32 in order that the transmitter may be operated for test purposes without radiating any signals at all from the antenna 22, thus avoiding revealing the presence of the apparatus to possible hostile observers until it is desired to employ the apparatus for purposes of location.

If desired, another limit switch may be provided in order to prevent the travel of the shaft 39, in the direction which is not shown limited on Fig. 2, from exceeding a quarter-wave length or some other predetermined value. In general this will not be necessary because the received signals will become imperceptible long before minimum radiation from the antenna 22 is obtained.

In order to provide suitable control for the double-action relay 43 the automatic volume control apparatus 26 may include two electronic relay circuits operated in parallel, which may both be of the pulse-lengthening type, one of which is adapted to energize the coil 46 of the relay 43 when pulse signals in the receiver exceed a first predetermined intensity and the other of which is adapted to energize the coil 47 of the relay when the amplitude of pulses in the receiver 24 is less than a second predetermined value. Thus, when the pulses in the receiver 24 have an intensity lying between the aforesaid predetermined values, neither coil of the relay 43 is energized and the transmitter output control retains its previous adjustment. If desired, a single-acting relay may be used instead of the relay 43, thus simplifying the automatic volume control apparatus 46 but introducing the difficulty that the motor 42 will be constantly operating in one direction or the other except when the limit swich 44 is open. This may give the apparatus an excessive "hunting" characteristic and may result in more prolonged operation of the motor 42 than is really necessary.

If several targets are visible in the indicator 25 and it is desired to select a particular one for approach, it will naturally be desirable to provide a "narrow gate" circuit acting to allow energization of automatic volume control apparatus 26 only with reference to the echo from the desired target, such narrow gate circuits being manually operable to select the desired target, the selection of the target being indicated by well-known means on the indicator 25.

It is to be understood that the blocks marked "AVC" in Figs. 1 and 2 need not necessarily respond to the intensity of the received signal. The transmitter power control effectuated by these circuits may instead be made to operate in accordance with a suitable function of the measured distance to the target. In such case the blocks marked "AVC" (indicated at 15 in Fig. 1 and at 26 in Fig. 2) would include a circuit for producing a voltage or a mechanical displacement proportional to the elapsed time between the transmission of a pulse by the transmitter and the reception of an echo from the target, and also a device responsive to such voltage or displacement adapted to control the power divider in the transmitter output line so as to adjust the radiated power in accordance with a desired function of the measured distance, such as the fourth power thereof, or such other exponential function as may be found experimentally to be appropriate.

The circuit for producing the voltage or mechanical displacement proportional to target range may be any of a number of known "automatic range tracking" circuits. One such circuit is described in the patent application of E. F. MacNichol, Serial No. 631,944, filed November 29, 1945. Other simpler range-tracking circuits and devices are also known. Such circuits will generally be correlated with the indicator of the system and it is to be understood that when the device 15 or the device 26 is operated on "range" information a suitable connection with the indicator 14 or 25, respectively, will usually be desirable. In general, control of the transmitter in accordance with receiver volume level is to be preferred on account of the relative simplicity of the control circuits. Control from measurement of target range is independent of fading, however. Such control may be relatively easy to add to a given equipment if such equipment already includes automatic range tracking in some form, as is often the case with apparatus adapted for "blind" bombing of targets, for instance, the apparatus shown in the patent application of B. L. Havens, Serial No. 535,852, filed May 16, 1944. In such case, all that need be added is a suitable servo-motor system and a suitable gear or cam drive for the output power divider.

Similarly, it will be seen that when a narrow gate circuit is used as aforesaid to select an echo, if the "gate" is narrow in range and its position consequently indicates the range of the target, control of the radiated power can be exercised by suitable translating apparatus responsive to a voltage or a shaft motion corresponding to the position (timing) of the gate.

An advantage of control of transmitter power in terms of range rather than in terms of received echo strength is that the lack of compensation for changes in reflectivity of the target (some of which might be controllable by the target craft) would avoid giving away to the target craft the information that the transmitter power is being varied. The behavior of the two systems will also differ with respect to the interference effects of ground (sea) reflections which normally introduce variations of signal strength with range.

A preferred construction of the power divider apparatus is shown in cross section in Fig. 3. The apparatus shown in Fig. 3 is substantially the same as that shown in the neighborhood of the junction 30 of Fig. 2 and corresponding parts are in general indicated by the same reference numbers. Instead of simple short-circuiting plugs 35 and 36 which were shown in Fig. 2 for purposes of simplicity of illustration, there are shown in Fig. 3 plungers 50 and 51 adapted to perform the corresponding functions with a minimum of contact losses and the like. The plungers 50 and 51 are actuated by the rods 52 and 53 respectively and are supported by tubular members 54, 55 sliding respectively on bushings 56 and 57 mounted respectively on the inner conductor 58 and 59 of the transmisison line 33 and 34 respectively. The sleeves 54, 55 respectively support the annular plunger heads 50 and 51, upon which are respectively mounted the external sleeves 60 and 61 and the internal sleeves 62 and 63. The sleeves 60, 61 and 62, 63 are slightly less than a physical quarter-wave length long, so that the clearance space external of the external sleeves 60 and 61 is adapted to constitute a transmission line of an electrical length of a quarter-wave length and likewise the clearance located internally of the internal sleeves 62, 63 and the annular heads of the respective plungers has an axial dimension such that the annular cavities between the sleeves 54, 55 and the sleeves 60, 61 and between the sleeves 54, 55 and the sleeves 62, 63 will also have an electrical axial length of a quarter-wave length. In consequence, a very low impedance for the radio frequency in question is provided at the head surfaces of the plungers 50, 51 between the edges of such head surfaces and conductors of the transmission line 33 and 34 respectively, in spite of the fact that no actual electrical contact occurs at such places. The operation of plungers of this type is more fully described in the patent application of W. W. Salisbury, Serial No. 489,844, filed June 5, 1943, now Patent No. 2,451,876, granted October 19, 1948. The particular form of power divider shown in Figs. 2 and 3 is the invention of my colleague, George L. Ragan.

If desired, the form of the power divider apparatus may be modified by interchanging the position of the output arm and of the control branches, as shown in Fig. 3A. In Fig. 3A the power input line is shown at 66 and the output lines are shown at 67 and 68. The control branch lines are shown at 69 and 70, terminated respectively by the plungers 71 and 72. In this case the plungers are to be moved simultaneously in opposite directions instead of in the same directions since the control stubs 69 and 70 extend away in opposite directions from the input line 66. Thus simultaneous lengthening of the branch lines 69 and 70 will involve moving the plunger 71 to the left and the plunger 72 to the right. The mechanical arrangement will therefore be somewhat more complicated than that shown on Fig. 2. Other modifications of the power divider apparatus are also possible.

It is to be understood that the present invention is applicable to many different varieties of radio-echo detection apparatus. It is applicable to apparatus employing hollow pipe wave guides for transmission purposes instead of coaxial conductor transmission lines, analogous power divider apparatus being capable of construction for use in hollow pipe wave guide systems, applying the same principles, for instance, as those explained in connection with the power divider apparatus shown in Figs. 2 and 3. It is further to be understood in connection with the power divider apparatus that wherever the electrical lengths of a quarter or half wave length are specified, an odd multiple or an even multiple, respectively, of a quarter-wave length may be used equally as well. Likewise, where the term electrical length, is used, it is to be understood as meaning a physical length of such value as to give the electrical effect of the corresponding electrical length in free space. Thus, the electrical lengths mentioned are to be taken as including the contribution of "end effects." All distances referred to in terms of wave lengths are intended to be electrical lengths as defined above.

By means of automatic control, in accordance with this invention, of the power radiated by the transmitter from the antenna, certain advantages of surprise may be enjoyed by a pursuing craft equipped with radio-echo detection equipment, in spite of the fact that the pursued craft, if sufficiently alert, will be able to pick up the signals of the radio-echo detection equipment before echoes are detected by the pursuing craft. By this invention it is possible to operate radio-echo detection and location equipment in a manner designed to provide a minimum of information to hostile observers.

The arrangement of this invention has the further advantage that the amount of radiated power is limited to the minimum essential for the utility of the apparatus, thus reducing interference between different installations operating at or near the same frequency. This further advantage is of great importance in the case of joint operation of a large number of units. Also, when it is desired to employ the radio-echo location or detection apparatus in connection with nearby objects, the transmitter power may be automatically limited to the amount necessary to give a satisfactory minimum signal from the object selected, thereby reducing the radiation perceptible at greater distances. This is advantageous, for instance, when radio-echo equipment is employed for spacing ships in a convoy. In such case only enough power is radiated to obtain satisfactory reflection from neighboring ships, thus greatly reducing the chances that some hostile craft located 50 or 100 miles away may be able to detect the presence of the convoy.

What is claimed is:

1. In a radio-echo detection and location apparatus for approaching hostile craft, which apparatus includes a transmitter and a receiver of radio waves, the combination of means adapted to control the proportion of the maximum transmitter power radiated by said apparatus and means responsive to the intensity of received echo signals and adapted to control said first-mentioned means to reduce said radiated proportion of maximum transmitter power when the intensity of received echo signals exceeds a predetermined intensity until said proportion is approximately sufficient to produce echo signals of said predetermrined intensity, said last-mentioned means being also adapted to cause said proportion to be increased when the intensity of received echo signals falls substantially below said predetermined intensity.

2. A radio-echo detection and location apparatus for approaching hostile craft which apparatus includes a transmitter and receiver of radio waves, and an antenna, means adapted to control the proportion of the maximum transmitter power radiated by said apparatus from said antenna, which means includes a radio-frequency power divider apparatus adapted to divide the power output of said transmitter between an antenna and a substantially non-radiating load over a relatively wide range of ratios without substantial change in the input impedance of said power divider being connected to said transmitter on its input side and to said antenna on one of its output sides, said means including also a substantially non-radiating load connected to another output of said power divider, and means responsive to the intensity of received echo signals and adapted to control said first-mentioned means to reduce said radiated proportion of maximum transmitter power when the intensity of received echo signals exceeds a predetermined intensity until said proportion is approximately sufficient to produce echo signals of said predetermined intensity.

3. In a radio-echo detection and location apparatus for approaching hostile craft, which apparatus includes a transmitter and a receiver of radio waves and an antenna for said radio waves, the combination of means adapted to control the propagation of maximum transmitter power radiated by said apparatus and including a variable power divider for radio-frequency power and a substantially non-radiating load, said power divider being connected to said transmitter, said antenna and said load and being adapted controllably to divided the power output of said transmitter between said antenna and said load, and means responsive to the intensity of the received echo signals and adapted to control said first-mentioned means to reduce said radiated proportion of maximum transmitter power when the intensity of the received echo signals exceeds a predetermined intensity until said proportion is approximately sufficient to produce echo signals of said predetermined intensity.

4. In a radio-echo detection and location apparatus for approaching hostile craft which apparatus includes a transmitter and a receiver of radio waves and an antenna for said radio waves, the combination of means adapted to control the propagation of transmitter power radiated by said apparatus and including a variable power divider for radio-frequency power and a substantially non-radiating load, said power-divider being connected to said transmitter, said antenna and said load for controllably dividing the power output of said transmitter between said antenna and said load, and driving means connected to and operable by the output of said receiver and connected also to said power divider so as to vary the power radiated from said antenna automatically in approximate direct proportion to the fourth power of the distance to a target, after an echo of such target has been detected by said receiver.

5. A radio-echo detection and location apparatus for approaching hostile craft, which apparatus includes an antenna system, a transmitter adapted to transmit pulses of radio waves, a receiver adapted to receive echoes of said pulses and means operable by the output of said receiver for controlling the intensity of pulses radiated from said apparatus when transmitted by said transmitter, said means including a substantially non-radiating absorber and a power-divider, said power-divider being interposed between said transmitter and said antenna system and having an input connection to said transmitter and output connections to said antenna system and to said absorber.

6. A radio-echo detection and location apparatus for approaching hostile craft, which apparatus includes an antenna system, a transmitter adapted to transmit pulses of radio waves, a receiver adapted to receive echoes of said pulses and means operable by the output of said receiver for controlling the intensity of pulses radiated from said apparatus upon operation of said transmitter, said means including an absorber and a power-divider, said power-divider being interposed between said transmitter and said antenna system and having an input connection to said transmitter and output connections to said antenna system and to said absorber, said power-divider being further adapted to divide radio-frequency power, furnished by said transmitter, between said antenna system and said absorber in any desired ratio without the production of substantial standing wave intensities other than such as are substantially independent of said ratio.

7. A radio-echo detection and location apparatus for approaching hostile craft comprising a transmitter and receiver of radio waves, an antenna, and means connected between said transmitter and said antenna and operable in response to the intensity of energy received by said receiver for limiting the energy radiated from said apparatus to the amount necessary to produce received echo signals of a predetermined intensity.

8. In a radio-echo detection and location apparatus for approaching hostile craft including a transmitter and a receiver of radio waves and an antenna for said radio waves, power divider means connected between said transmitter and said antenna, and control apparatus coupled to said receiver and responsive to the intensity of echo signals received thereby being operative to control said power divider means, after echoes of a predetermined strength have been received from said hostile craft, to cause the amplitude of the energy radiated into space from said transmitter to vary in direct proportion to a power of the distance to said hostile craft, which power is higher than the second.

9. A radio-echo detection and location apparatus for approaching hostile craft comprising an antenna system, a transmitter for transmitting radio waves, a receiver for receiving echoes of said radio waves and means operable in response to the intensity of said received echoes for controlling the intensity of radio waves radiated from said apparatus, said means including a power divider connected between said transmitter and said antenna and a power absorber coupled to said power divider.

LUIS W. ALVAREZ.

REFERENCES CITED

The following references are of record in the file of this patent:

UNITED STATES PATENTS

| Number | Name | Date |
| --- | --- | --- |
| 2,055,883 | Terry | Sept. 29, 1936 |
| 2,259,658 | Parker | Oct. 21, 1941 |
| 2,268,643 | Crosby | Jan. 6, 1942 |
| 2,454,396 | Malling | Nov. 23, 1948 |